(12) United States Patent
Whitehead

(10) Patent No.: US 7,712,791 B1
(45) Date of Patent: May 11, 2010

(54) CAULKING SYSTEM

(76) Inventor: Anthony C. Whitehead, 12135 Doe Run Ct., Cincinnati, OH (US) 45240

( * ) Notice: Subject to any disclaimer, the term of this patent is extended or adjusted under 35 U.S.C. 154(b) by 672 days.

(21) Appl. No.: 11/620,433

(22) Filed: Jan. 5, 2007

(51) Int. Cl.
*F16L 41/00* (2006.01)

(52) U.S. Cl. ............ 285/215; 285/338; 285/196; 285/64; 285/217; 52/220.8; 52/232

(58) Field of Classification Search .......... 285/338, 285/346, 350, 908, 139.3, 196, 214, 215, 285/216, 217, 218, 192, 64; 52/220.8, 232
See application file for complete search history.

(56) References Cited

U.S. PATENT DOCUMENTS

| | | | |
|---|---|---|---|
| 3,896,511 A | | 7/1975 | Cuschera |
| 4,061,344 A | | 12/1977 | Bradley et al. |
| 4,086,736 A | * | 5/1978 | Landrigan ............. 52/220.8 |
| 4,136,707 A | * | 1/1979 | Gaillot et al. ............ 137/75 |
| 4,270,318 A | | 6/1981 | Carroll et al. |
| 4,332,393 A | | 6/1982 | Cuschera |
| 4,431,198 A | * | 2/1984 | Beinhaur et al. ......... 277/314 |
| 4,646,486 A | | 3/1987 | Hauff |
| 4,730,421 A | * | 3/1988 | Leeland ................. 52/58 |
| 4,850,385 A | * | 7/1989 | Harbeke ................. 137/75 |
| 4,894,966 A | * | 1/1990 | Bailey et al. ............ 52/317 |
| 5,155,957 A | * | 10/1992 | Robertson et al. ......... 52/232 |
| 5,257,641 A | * | 11/1993 | Elsbury et al. ........... 137/79 |
| 5,294,155 A | * | 3/1994 | Southwick .............. 285/64 |
| 5,347,767 A | * | 9/1994 | Roth .................... 52/1 |
| 5,351,448 A | * | 10/1994 | Gohlke et al. ............ 52/1 |
| 5,417,019 A | | 5/1995 | Marshall et al. |
| 5,548,934 A | * | 8/1996 | Israelson ............ 52/220.8 |
| 6,029,412 A | * | 2/2000 | Gohlke ................ 52/232 |
| 6,176,052 B1 | * | 1/2001 | Takahashi .............. 52/232 |
| 6,305,425 B1 | * | 10/2001 | Korn .................. 138/110 |
| 6,336,297 B1 | | 1/2002 | Cornwall |
| 6,601,852 B1 | * | 8/2003 | Kogler et al. ........... 277/314 |
| 7,010,889 B1 | * | 3/2006 | Renfro ................. 52/219 |
| 7,237,806 B2 | * | 7/2007 | Krowech et al. ........ 285/136.1 |

* cited by examiner

*Primary Examiner*—David E Bochna

(57) ABSTRACT

A caulking system for applying and maintaining a position of caulk between a pipe and a floor to provide a firestop around the pipe includes a pair of collar portions. Each of the collar portions is positioned around the pipe and engages a peripheral edge in a hole in the floor to maintain a position of the pipe with respect to the hole. The collar portions extend around the pipe when the collar portions are coupled to each other. A caulk is engaged by the collar portions to keep the caulk positioned around the pipe and positioned between the pipe and the floor. The caulk inhibits passage of air, liquid or fire between the floor and the pipe.

15 Claims, 8 Drawing Sheets

US 7,712,791 B1

CAULKING SYSTEM

BACKGROUND OF THE INVENTION

1. Field of the Invention

The present invention relates to caulk fittings and more particularly pertains to a new caulk fitting for applying and maintaining a position of caulk between a pipe and a floor to provide a firestop around the pipe.

2. Description of the Prior Art

The use of caulk fittings is known in the prior art. While these devices fulfill their respective, particular objectives and requirements, the need remains for a system that has certain improved features allows for the system to be positioned around a pipe extending through a hole in a floor after the pipe has been put in place. Additionally, the system applies caulk between the pipe and the floor to provide a firestop.

SUMMARY OF THE INVENTION

The present invention meets the needs presented above by generally comprising a pair of collar portions. Each of the collar portions is positioned around the pipe and engages a peripheral edge in a hole in the floor to maintain a position of the pipe with respect to the hole. The collar portions extend around the pipe when the collar portions are coupled to each other. A caulk is engaged by the collar portions to keep the caulk positioned around the pipe and positioned between the pipe and the floor. The caulk inhibits passage of air, liquid or fire between the floor and the pipe.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
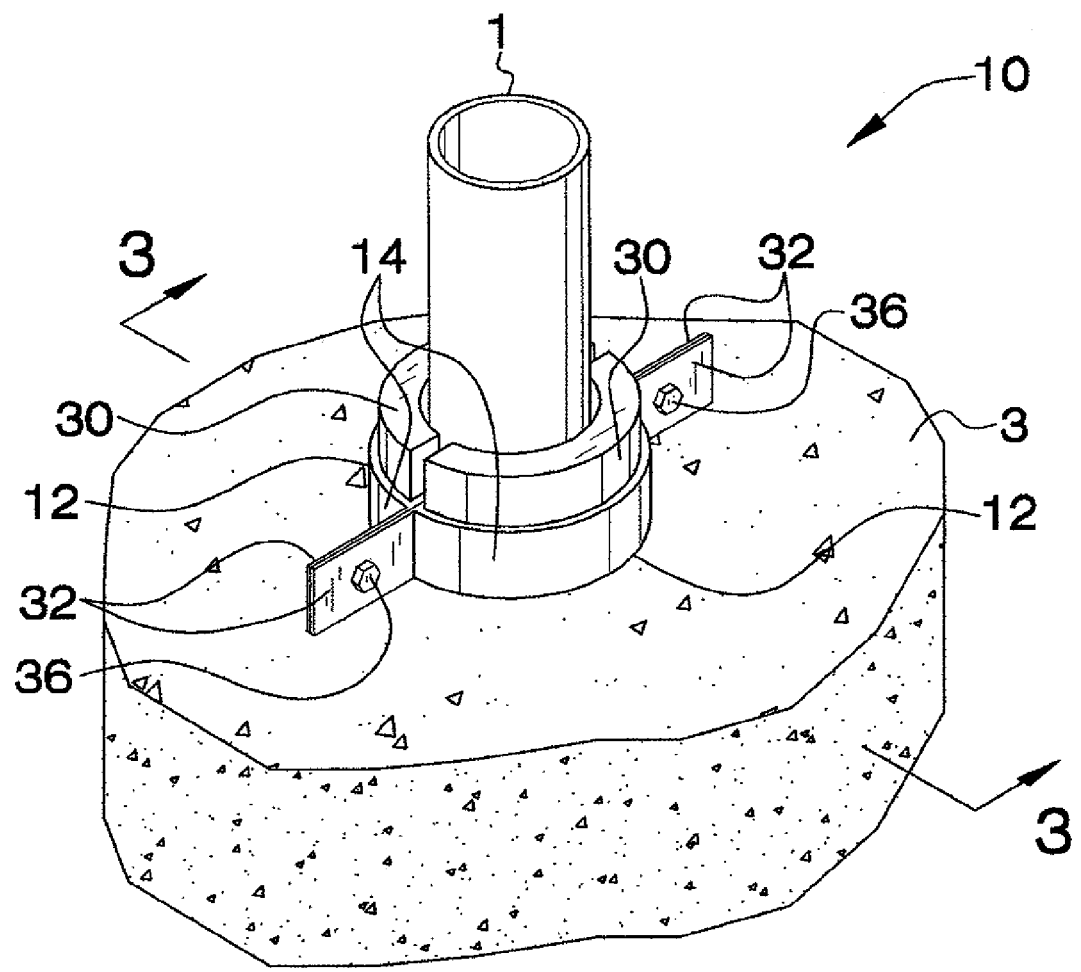
FIG. 1 is a perspective view of a caulking system according to the present invention shown in place around a pipe.
Figure 2:
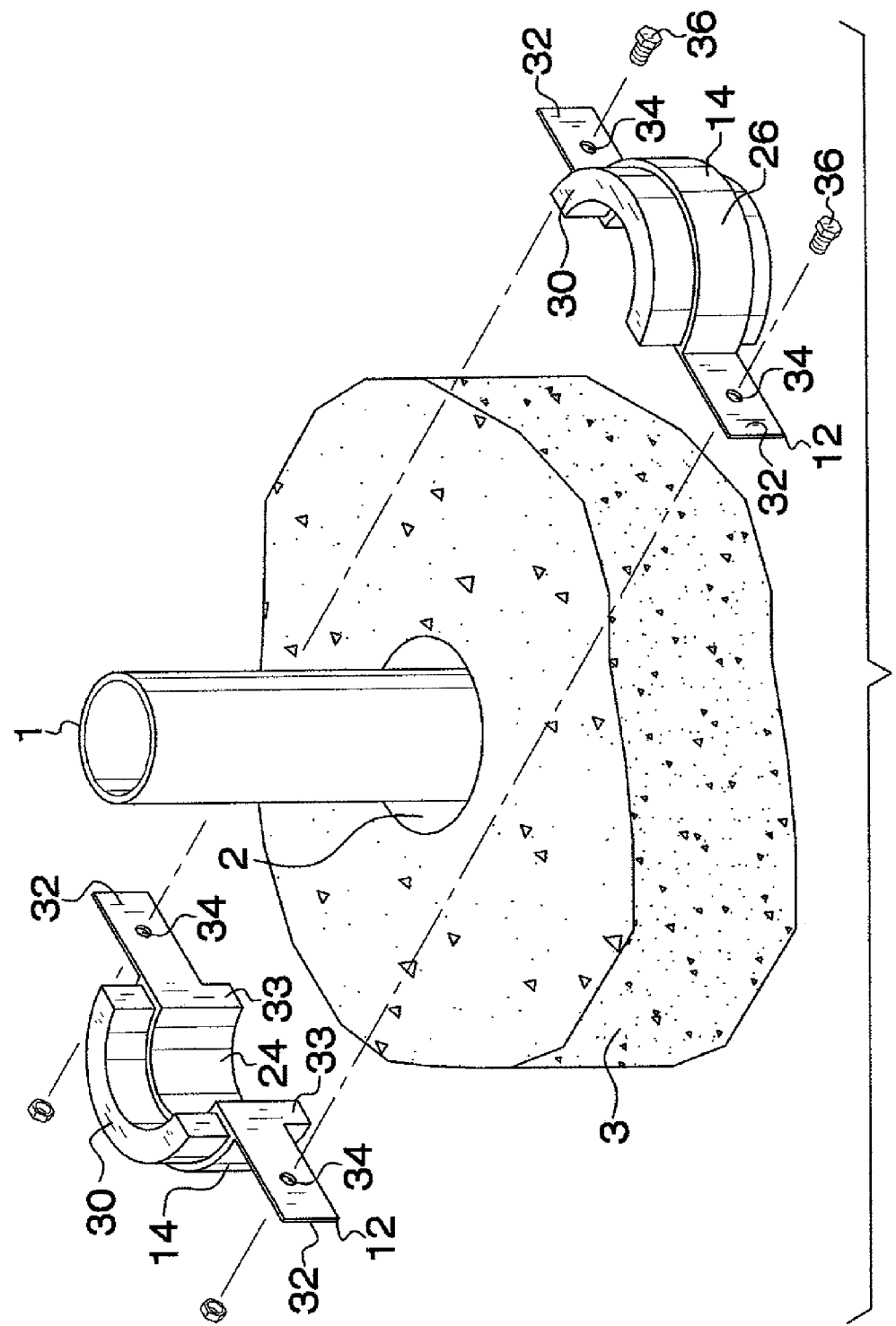
FIG. 2 is an exploded perspective view of the present invention.
Figure 3:
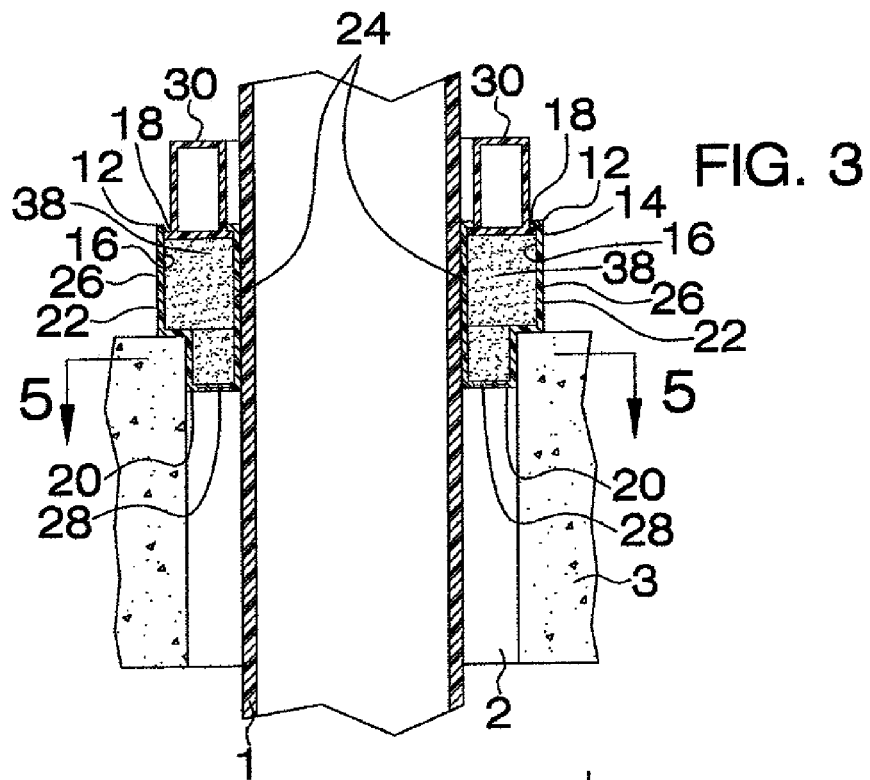
FIG. 3 is a cross-sectional view of the present invention taken along line 3-3 of FIG. 1.
Figure 4:
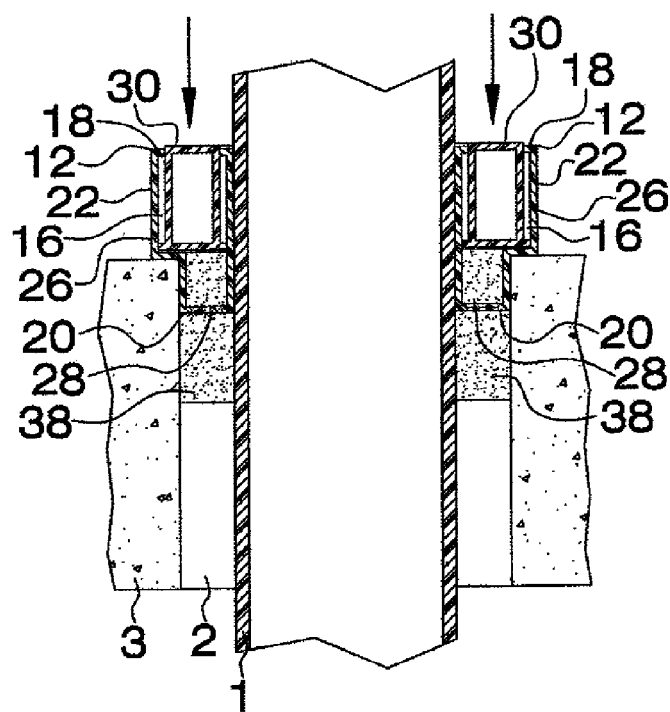
FIG. 4 is a cross-sectional view of the present invention as shown in FIG. 3 with the press of each collar portion depressed to extrude the caulk.
Figure 5:
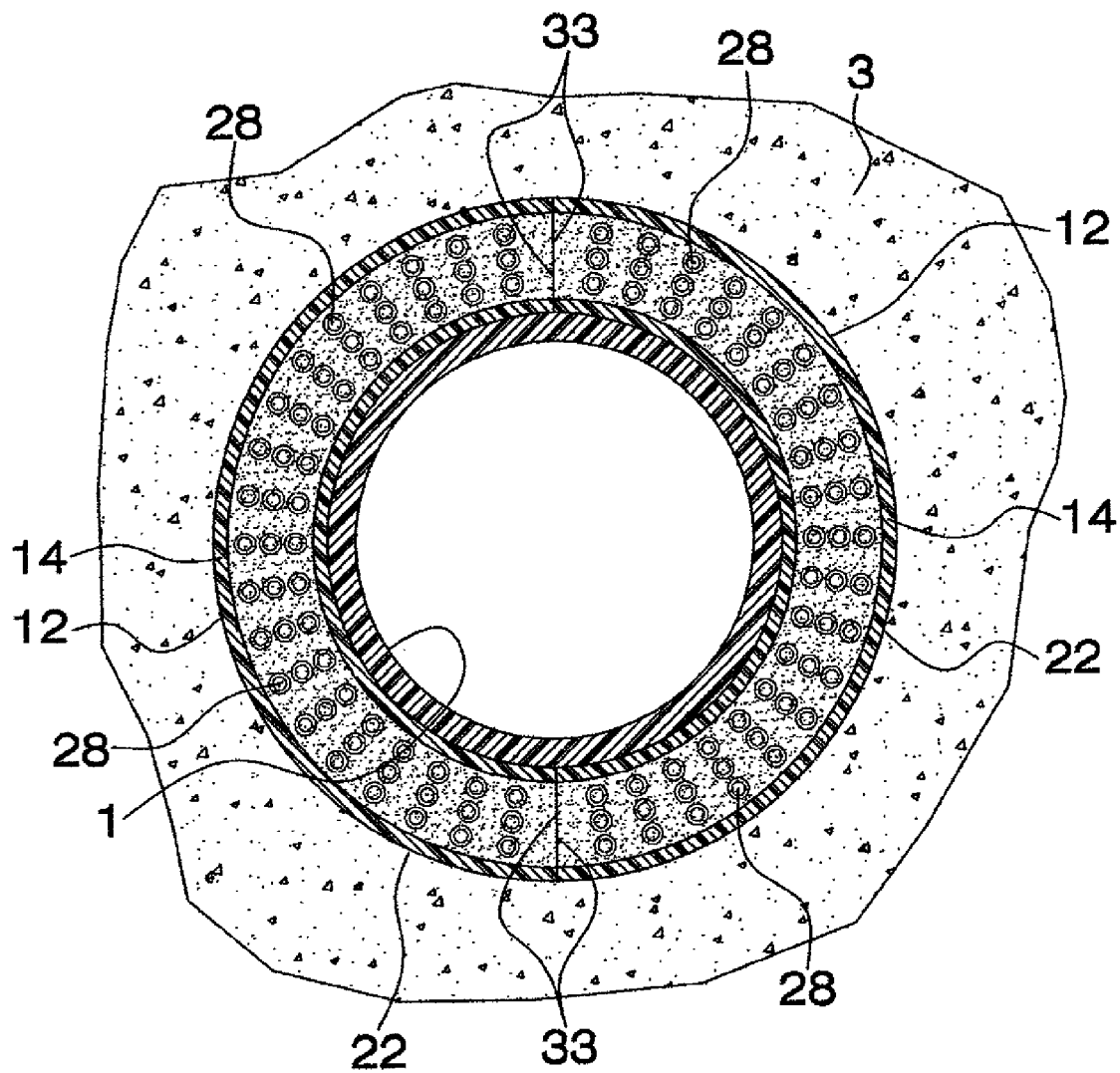
FIG. 5 is a cross-sectional view of the present invention taken along line 5-5 of FIG. 3.

With reference now to the drawings, and in particular to FIGS. 1 through 10 thereof, a new caulk fitting embodying the principles and concepts of the present invention and generally designated by the reference numeral 10 will be described.

As best illustrated in FIGS. 1 through 10, the caulking system 10 generally comprises a pair of collar portions 12. Each of the collar portions 12 is positioned around a pipe 1 and engages a peripheral edge in a hole 2 in a floor 3 to maintain a position of the pipe 1 with respect to the hole 2. The collar portions 12 extend around the pipe 1 when the collar portions 12 are coupled to each other.

Each of the collar portions 12 includes a reservoir 14 having a semi-cylindrical shape and is positioned around a portion of the pipe 1 when the collar portions 12 are positioned around the pipe 1. The reservoir 14 has an interior space 16 defined by a top wall 18, a bottom wall 20 and a peripheral wall 22 extending between the top wall 18 and the bottom wall 20. An interior face 24 of the peripheral wall 22 abuts the pipe 1 when the collar portions 12 are positioned around the pipe 1. An exterior face 26 of the peripheral wall 22 is necked inwardly adjacent to the bottom wall 20 to allow a portion of the peripheral wall 22 and the bottom wall 20 to be positioned in the hole 2. The bottom wall 20 has a plurality of extrusion apertures 28 extending therethrough, wherein each of the extrusion apertures 28 is in fluid communication with the interior space 16.

Each of the collar portions 12 additionally includes a press 30 slidably extending through the top wall 18 of the reservoir 14 and into the interior space 16 of the reservoir 14. Each of a pair of tabs 32 is coupled to opposing ends 33 of the reservoir 14. Each of the tabs 32 has a mounting aperture 34 extending therethrough. The mounting aperture 34 of one of the tabs 32 of each of the collar portions 12 receives one of a plurality of fasteners 36 to secure the collar portions 12 together.

A caulk 38 is engaged by the collar portions 12 to keep the caulk 38 positioned around the pipe 1 and positioned between the pipe 1 and the floor 3. The caulk 38 inhibits passage of air, liquid or fire between the floor 3 and the pipe 1. The caulk 38 is positioned in the interior space 16 of the reservoir 14 between the bottom wall 20 and the press 30. The press 30 of each of the collar portions 12 is pushed into the interior space 16 of the reservoir 14 to extrude the caulk 38 through the extrusion apertures 28 of the bottom wall 20 into the hole 2 around the pipe 1.

Figure 6:
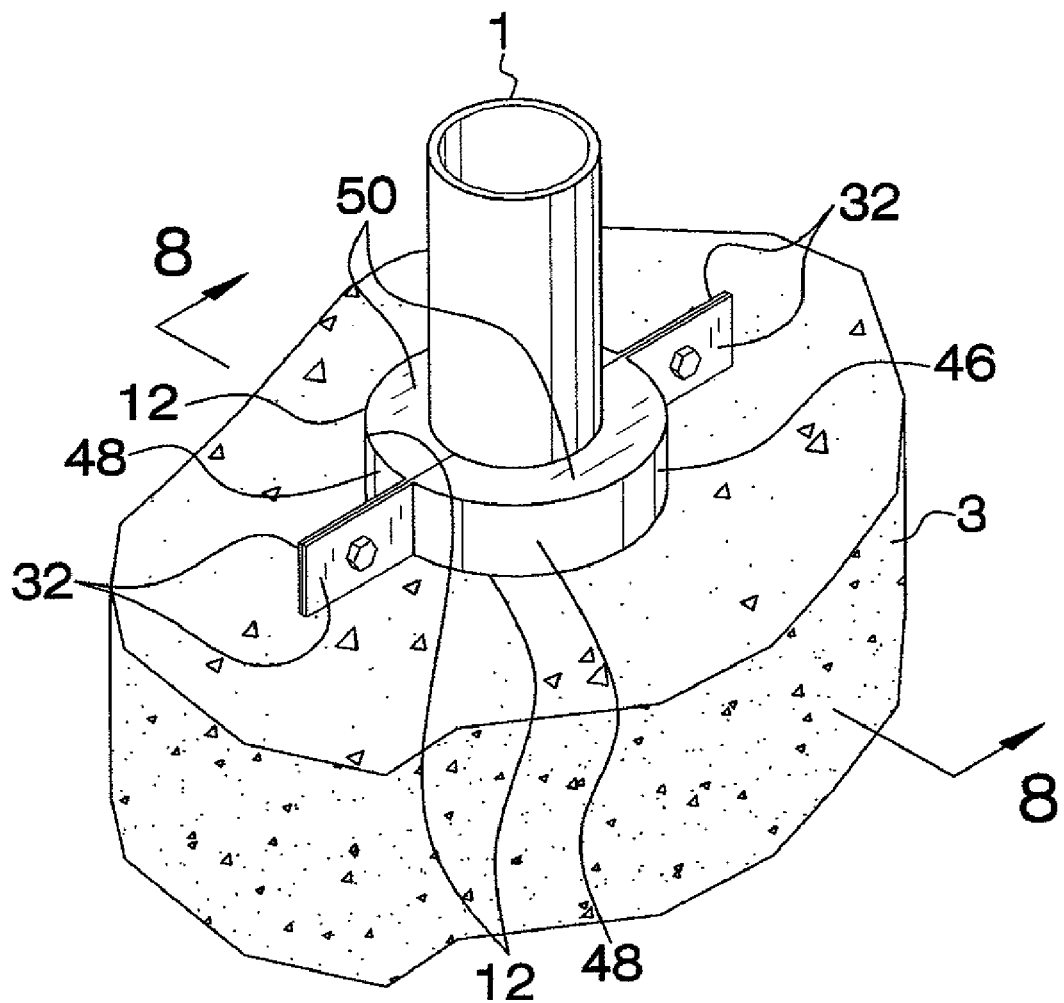
FIG. 6 is a perspective view of an embodiment of the present invention.
Figure 7:
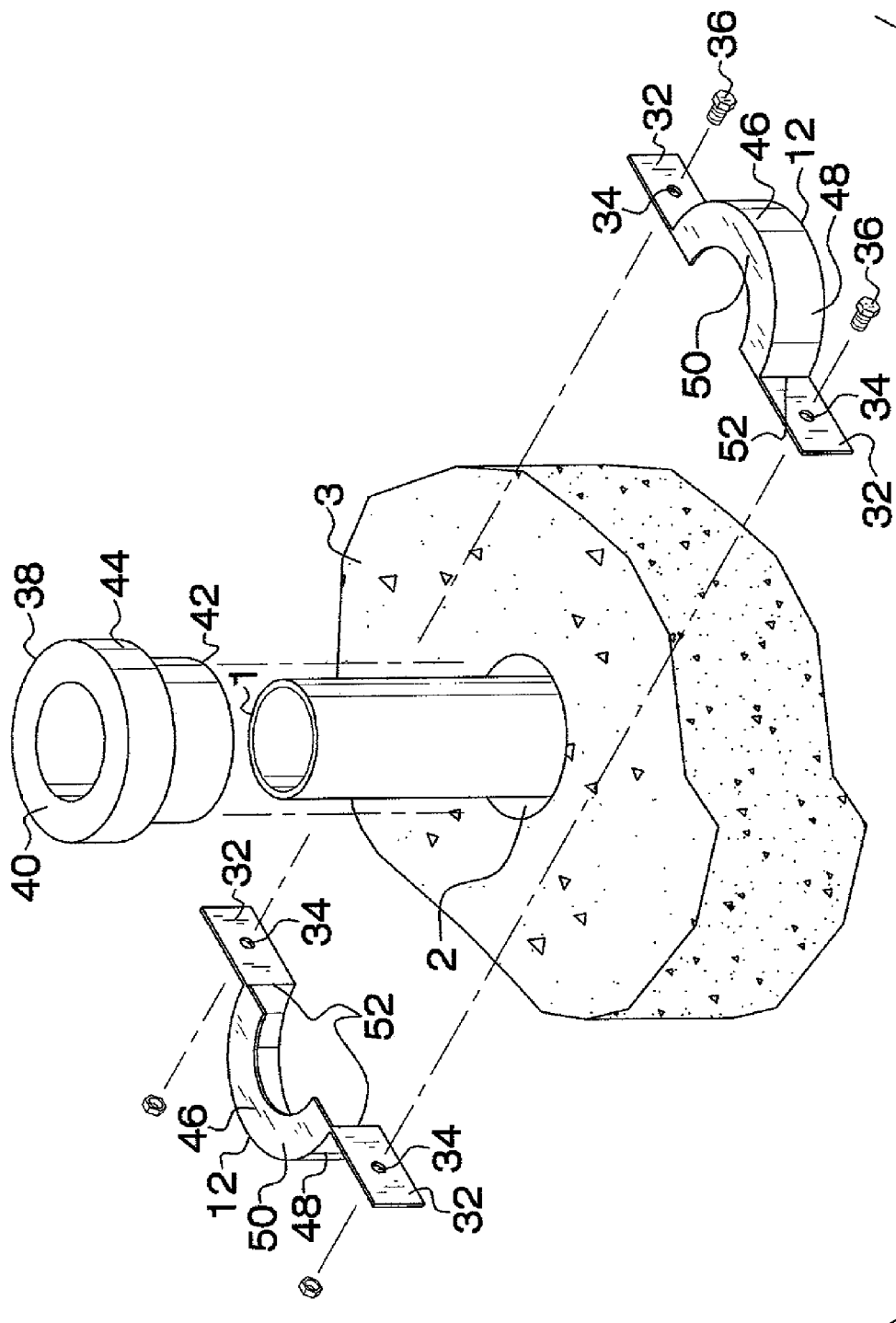
FIG. 7 is an exploded perspective view of the embodiment of the present invention shown in FIG. 6.
Figure 8:
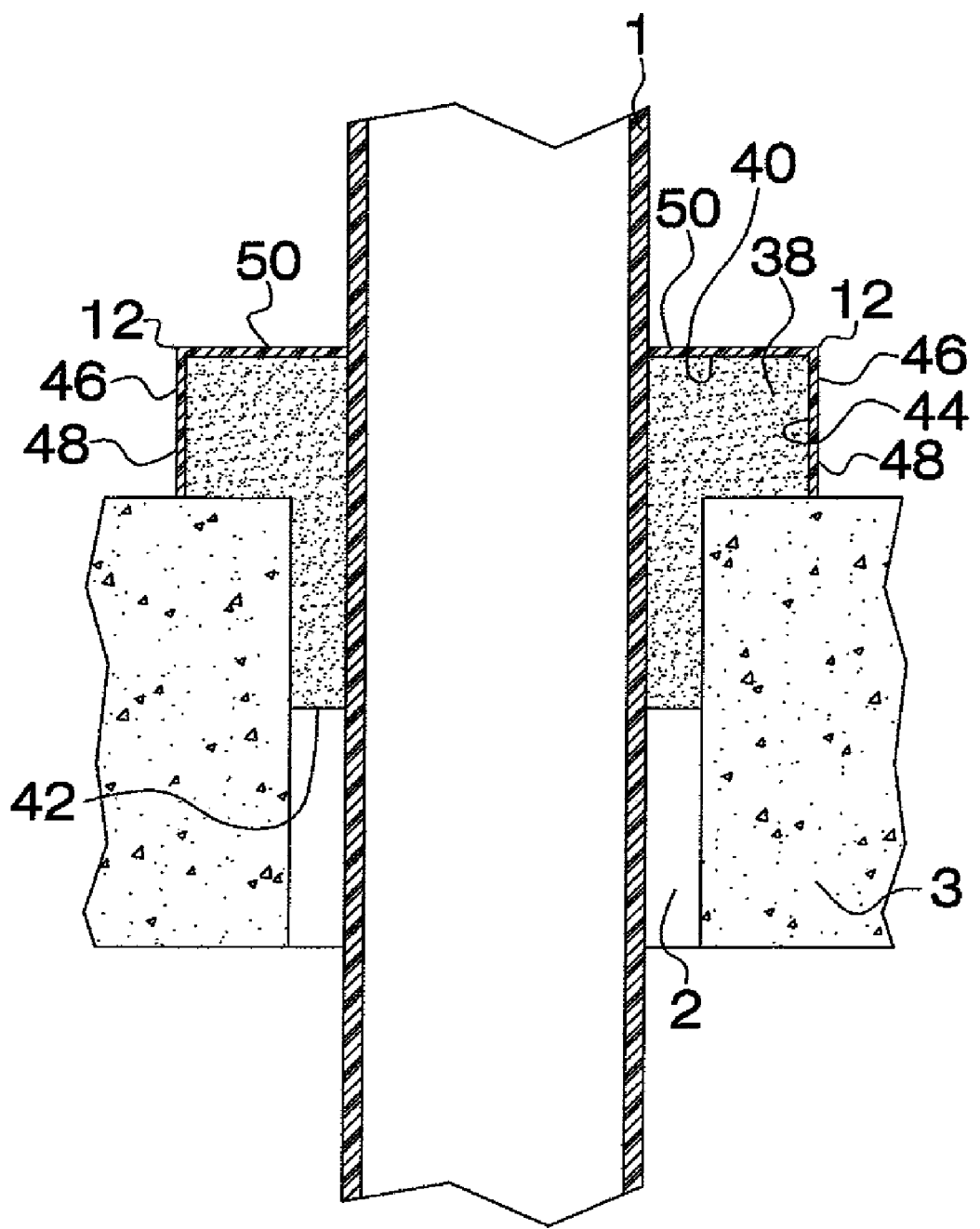
FIG. 8 is a cross-sectional view of the embodiment of the present invention taken along line 8-8 of FIG. 6.

In an embodiment, as shown in FIGS. 6 through 8, wherein the caulk 38 is approximately cylindrical shaped. The caulk 38 is of a rigidly pliable material to permit manipulation of the caulk 38 while maintaining the shape of the caulk 38. The caulk 38 is slid over the pipe 1 to position the caulk 38 around the pipe 1 and in the hole 2. The collar portions 12 engage the caulk 38 to secure the caulk 38 in position around the pipe 1. The caulk 38 includes a top end 40, a bottom end 42 and an exterior surface 44 extending between the top end 40 and the bottom end 42. The exterior surface 44 is necked inwardly adjacent the bottom end 42 to permit the bottom end 42 to be inserted into the hole 2.

Each of the collar portions 12 includes a cover 46. The cover 46 is approximately semi-cylindrical shaped. The cover 46 extends over the top end 40 of the caulk 38 and a portion of the exterior surface 44 of the caulk 38 to maintain position of the caulk 38 when the collar portions 12 are positioned around the pipe 1. The cover 46 includes a vertical wall 48 and a horizontal wall 50. The horizontal wall 50 is positioned over the top end 40 of the caulk 38. The vertical wall 48 extends over a portion of the exterior surface 44 of the caulk 38. In the embodiment shown in FIGS. 6 through 8, each of the tabs 32 is coupled to terminal ends 52 of the cover 46.

Figure 9:
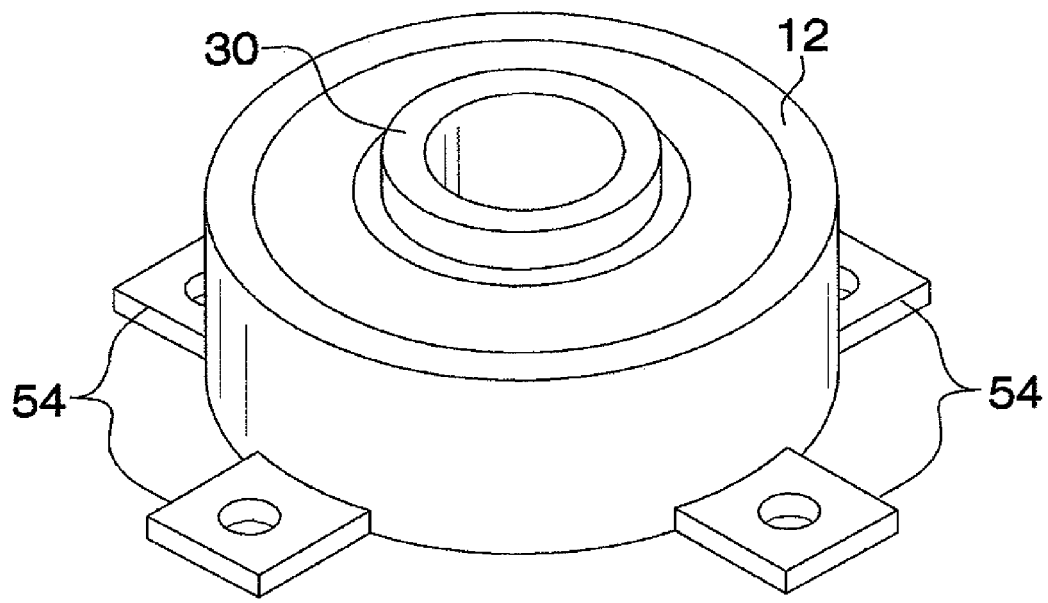
FIG. 9 is a front perspective view of an embodiment of the present invention.
Figure 10:
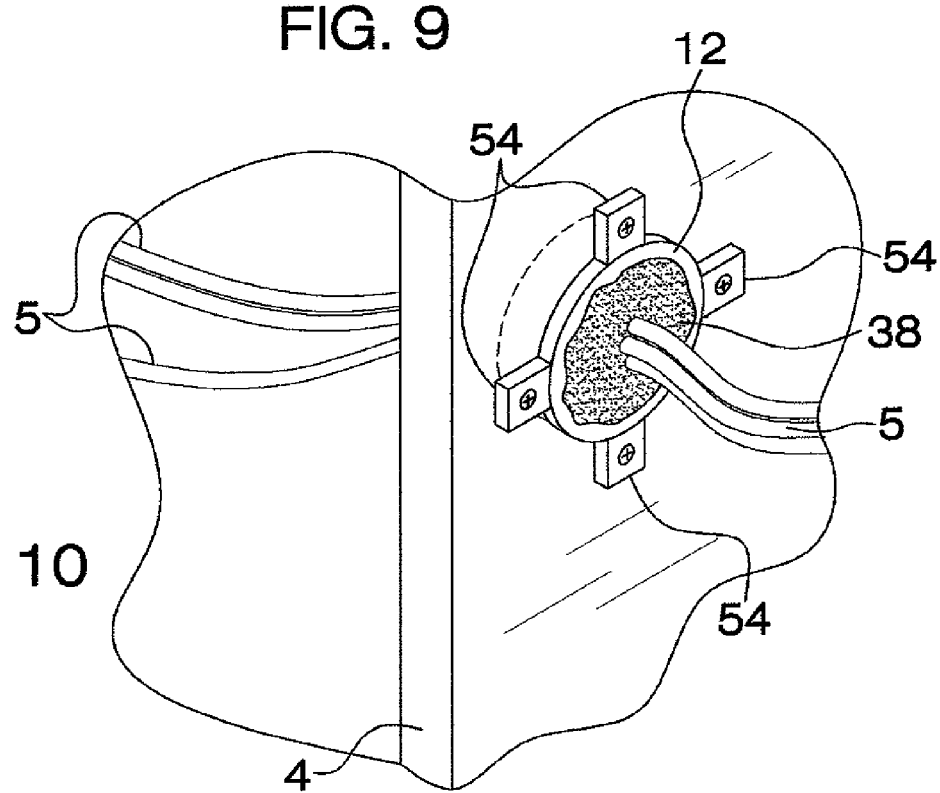
FIG. 10 is a rear perspective view of the embodiment of the present invention shown in use.

In an embodiment, as shown in FIGS. 9 and 10, the collar portions 12 are integrally coupled together. A plurality of securing tabs 54 is coupled to the collar portions 12. Each of the securing tabs 54 receives one of a plurality of securing fasteners to secure the collar portions 12 into the hole 1 in a wall 4. Wires 5 are passed between the collar portions 12 and through the hole 1 in the wall 4. The press 30 is actuated to dispense the caulk around the wires 5 and seal the hole 1 around the wires 5.

In use, the collar portions 12 are positioned around the pipe 1 and into the with the bottom wall 20 of the reservoir 14 each of the collar portions 12 extending into the hole 2. The fasteners 36 are then used to secure the tabs 32 of the collar portions 12 together to secure the collar portions 12 around the pipe 1. The press 30 of each of the collar portions 12 is press 30ed into the reservoir 14 to force the caulk 38 out of the extrusion apertures 28 into the hole 2 and around the pipe 1. In the embodiment shown in FIGS. 6 through 8, the caulk 38 is slid onto the pipe 1 with the bottom end 42 being slid into the hole 2 when the caulk 38 is slid on the pipe 1. The cover 46 of each of the collar portions 12 is positioned over a top end 40 and a portion of the exterior surface 44 of the caulk 38. The collar portions 12 are secured together to maintain positioning of the caulk 38 with respect to the pipe 1.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A caulking system for caulking around a pipe extending through a floor of a structure, said system comprising:
 a pair of collar portions, each of said collar portions being positioned around the pipe and engaging a peripheral edge in a hole in the floor to maintain a position of the pipe with respect to the hole, said collar portions extending around the pipe when said collar portions are coupled to each other;
 a caulk being engaged by said collar portions to keep said caulk positioned around the pipe and positioned between the pipe and the floor, said caulk inhibiting passage of air, liquid or fire between the floor and the pipe;
 each of said collar portions including;
  a reservoir having a semi-cylindrical shape and being positioned around a portion of the pipe when said collar portions are positioned around the pipe, said reservoir having an interior space defined by a top wall, a bottom wall and a peripheral wall extending between said top wall and said bottom wall, said bottom wall having a plurality of extrusion apertures extending therethrough, wherein each of said extrusion apertures is in fluid communication with said interior space; and
  a press slidably extending through said top wall of said reservoir and into said interior space of said reservoir, said caulk being positioned in said interior space of said reservoir between said bottom wall and said press, said press being pushed into said interior space of said reservoir to extrude said caulk through said extrusion apertures of said bottom wall into the hole around the pipe.

2. The system according to claim 1, wherein an interior face of said peripheral wall abuts the pipe when said collar portions are positioned around the pipe.

3. The system according to claim 1, wherein an exterior face of said peripheral wall is necked inwardly adjacent to said bottom wall to allow a portion of said peripheral wall and said bottom wall to be positioned in the hole.

4. The system according to claim 1, wherein each of said collar portions includes a pair of tabs, each of said tabs being coupled to opposing ends of said reservoir.

5. The system according to claim 4, wherein each of said tabs has a mounting aperture extending therethrough; said mounting aperture of one of said tabs of each of said collar portions receiving one of a plurality of fasteners to secure said collar portions together.

6. The system according to claim 1, wherein said caulk is approximately cylindrical shaped, said caulk being of a rigidly pliable material to permit manipulation of said caulk while maintaining the shape of said caulk, said caulk being slid over the pipe to position said caulk around the pipe and in the hole, said collar portions engaging said caulk to secure said caulk in position around the pipe.

7. The system according to claim 6, wherein said caulk includes a top end, a bottom end and an exterior surface extending between said top end and said bottom end, said exterior surface being necked inwardly adjacent said bottom end to permit said bottom end to be inserted into the hole.

8. The system according to claim 7, wherein each of said collar portions includes a cover, said cover being approximately semi-cylindrical shaped, said cover extending over a top end of said caulk and a portion of an exterior surface of said caulk to maintain position of said caulk when said collar portions are positioned around the pipe.

9. The system according to claim 8, wherein said cover includes a vertical wall and a horizontal wall, said horizontal wall being positioned over said top end of said caulk, said vertical wall extending over a portion of said exterior surface of said caulk.

10. The system according to claim 8, wherein each of said collar portions includes a pair of tabs, each of said tabs being coupled to terminal ends of said cover, each of said tabs having a mounting aperture extending therethrough, said mounting aperture of one of said tabs of each of said collar portions receiving one of a plurality of fasteners to secure said collar portions together.

11. A caulking system for caulking around a pipe extending through a floor of a structure, said system comprising:
 a pair of collar portions, each of said collar portions being positioned around the pipe and engaging a peripheral edge in a hole in the floor to maintain a position of the pipe with respect to the hole, said collar portions extending around the pipe when said collar portions are coupled to each other, each of said collar portions comprising;

a reservoir having a semi-cylindrical shape and being positioned around a portion of the pipe when said collar portions are positioned around the pipe, said reservoir having an interior space defined by a top wall, a bottom wall and a peripheral wall extending between said top wall and said bottom wall, an interior face of said peripheral wall abutting the pipe when said collar portions are positioned around the pipe, an exterior face of said peripheral wall being necked inwardly adjacent to said bottom wall to allow a portion of said peripheral wall and said bottom wall to be positioned in the hole, said bottom wall having a plurality of extrusion apertures extending therethrough, wherein each of said extrusion apertures is in fluid communication with said interior space;

a press slidably extending through said top wall of said reservoir and into said interior space of said reservoir;

a pair of tabs, each of said tabs being coupled to opposing ends of said reservoir, each of said tabs having a mounting aperture extending therethrough, said mounting aperture of one of said tabs of each of said collar portions receiving one of a plurality of fasteners to secure said collar portions together; and a caulk being engaged by said collar portions to keep said caulk positioned around the pipe and positioned between the pipe and the floor, said caulk inhibiting passage of air, liquid or fire between the floor and the pipe, said caulk being positioned in said interior space of said reservoir between said bottom wall and said press, said press of each of said collar portions being pushed into said interior space of said reservoir to extrude said caulk through said extrusion apertures of said bottom wall into the hole around the pipe.

12. A caulking system for caulking around a pipe extending through a floor of a structure, said system comprising:

a pair of collar portions, each of said collar portions being positioned around the pipe and engaging a peripheral edge in a hole in the floor to maintain a position of the pipe with respect to the hole, said collar portions extending around the pipe when said collar portions are coupled to each other; and a caulk being engaged by said collar portions to keep said caulk positioned around the pipe and positioned between the pipe and the floor, said caulk inhibiting passage of air, liquid or fire between the floor and the pipe, said caulk being approximately cylindrical shaped, said caulk being of a rigidly pliable material to permit manipulation of said caulk while maintaining the shape of said caulk, said caulk being slid over the pipe to position said caulk around the pipe and in the hole, said collar portions engaging said caulk to secure said caulk in position around the pipe, said caulk including a top end, a bottom end and an exterior surface extending between said top end and said bottom end, said exterior surface being necked inwardly adjacent said bottom end to permit said bottom end to be inserted into the hole.

13. The system according to claim 12, wherein each of said collar portions includes a cover, said cover being approximately semi-cylindrical shaped, said cover extending over a top end of said caulk and a portion of an exterior surface of said caulk to maintain position of said caulk when said collar portions are positioned around the pipe.

14. The system according to claim 13, wherein said cover includes a vertical wall and a horizontal wall, said horizontal wall being positioned over said top end of said caulk, said vertical wall extending over a portion of said exterior surface of said caulk.

15. The system according to claim 13, wherein each of said collar portions includes a pair of tabs, each of said tabs being coupled to terminal ends of said cover, each of said tabs having a mounting aperture extending therethrough, said mounting aperture of one of said tabs of each of said collar portions receiving one of a plurality of fasteners to secure said collar portions together.

* * * * *